United States Patent
Pietraski et al.

(10) Patent No.: US 7,609,785 B2
(45) Date of Patent: *Oct. 27, 2009

(54) MITIGATION OF INTERFERENCE IN CELL SEARCH BY WIRELESS TRANSMIT AND RECEIVE UNITS

(75) Inventors: Philip J. Pietraski, Huntington Station, NY (US); Alpaslan Demir, East Meadow, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/190,935

(22) Filed: Aug. 13, 2008

(65) Prior Publication Data

US 2008/0310374 A1 Dec. 18, 2008

Related U.S. Application Data

(63) Continuation of application No. 10/660,842, filed on Sep. 12, 2003, now Pat. No. 7,415,084.

(60) Provisional application No. 60/410,735, filed on Sep. 12, 2002.

(51) Int. Cl.
*H04L 27/14* (2006.01)
*H03D 1/04* (2006.01)

(52) U.S. Cl. .................... 375/335; 375/346

(58) Field of Classification Search ............ 375/346, 375/335, 130, 145, 146, 149, 362; 370/350, 370/342, 335, 320

See application file for complete search history.

(56) References Cited

U.S. PATENT DOCUMENTS

| 5,559,790 | A | 9/1996 | Yano et al. |
| 6,185,244 | B1 | 2/2001 | Nystrom et al. |
| 6,363,106 | B1 | 3/2002 | Popovic et al. |
| 6,385,259 | B1 * | 5/2002 | Sung et al. ................ 375/343 |

(Continued)

FOREIGN PATENT DOCUMENTS

EP    1 215 829    6/2002

(Continued)

OTHER PUBLICATIONS

"Secondary Synchronisation Codes (SSC) Corresponding to the Generalised Hierarchical Golay (GHG) PSC", Texas Instruments, TSGR R1#5(99)574, Cheju Korea, Jun. 1-4, 1999.

(Continued)

*Primary Examiner*—Khai Tran
(74) *Attorney, Agent, or Firm*—Volpe and Koenig, P.C.

(57) ABSTRACT

A wireless transmit receive unit (WTRU) provides facilitation of cell search. In one embodiment, received samples are split into a plurality of sample sets for processing. Each of the sets is processed and an accumulated result is divided by an estimated noise value. In another embodiment, a code correlator correlates the received signal with a primary synchronization code and an auxiliary code correlator having a same length as the code correlator correlates the received signal with a code having a low cross correlation with the primary synchronization code. In another embodiment, a division of an accumulated result with a noise estimate is performed using indexes of the most significant bits.

23 Claims, 4 Drawing Sheets

U.S. PATENT DOCUMENTS

| | | |
|---|---|---|
| 6,480,558 B1 | 11/2002 | Ottosson et al. |
| 6,804,315 B2 | 10/2004 | Demir et al. |
| 7,062,002 B1 | 6/2006 | Michel et al. |
| 2001/0040884 A1 | 11/2001 | Bouquier et al. |
| 2002/0034944 A1 | 3/2002 | Tanno et al. |
| 2002/0057664 A1 | 5/2002 | Sarkar |
| 2003/0108135 A1 | 6/2003 | Frigon |
| 2003/0202564 A1 | 10/2003 | Ho et al. |
| 2003/0231705 A1 | 12/2003 | Lewis |
| 2005/0271177 A1 | 12/2005 | Demir et al. |

FOREIGN PATENT DOCUMENTS

| | | |
|---|---|---|
| WO | 01/28120 | 4/2001 |
| WO | 02/069551 | 9/2002 |

OTHER PUBLICATIONS

"Prioritisation for R3 Regarding Release 99", 3GPP TSGR #5(99)574, Kyongiu, South Korea, Oct. 6-8, 1999.

Texas Instruments, "Generalized Hierarchical Golay Sequence for PSC with Low Complexity Correlation Using Pruned Efficient Golay Correlators", 3G TS 25.101, v. 3.1.0, May 25, 1999, pp. 1-4, see all pages.

\* cited by examiner

D = [ 1 4 128 64 8 2 32 16 ]
W = [ 1 1 1 1 1 -1 1 -1 ]

MITIGATION OF INTERFERENCE IN CELL SEARCH BY WIRELESS TRANSMIT AND RECEIVE UNITS

CROSS REFERENCE TO RELATED APPLICATION(S)

This application is a continuation of U.S. patent application Ser. No. 10/660,842, filed Sep. 12, 2003, now U.S. Pat. No. 7,415,084, issued Aug. 18, 2008, which claims priority from U.S. Provisional Application No. 60/410,735 filed Sep. 12, 2002, which are all incorporated by reference as if fully set forth.

FIELD OF INVENTION

The present invention generally relates to the synchronization of a wireless transmit and receive unit (WTRU) to a base station. More particularly, the present invention relates to a cell search system that utilizes improved initial cell search capabilities for the purpose of accepting valid synchronization code detections.

BACKGROUND

Initial cell search algorithms are used to synchronize a WTRU to a base station. The WTRU accomplishes the synchronization procedure via a common channel called the physical synchronization channel (PSCH). In a typical example, the PSCH has a structure wherein the same primary synchronization code (PSC) is transmitted at the beginning of each slot of a frame (which, for example, may have a length of 15 slots), while a different secondary synchronization code (SSC) is transmitted for each slot, resulting in 15 different SSCs. A frame that is 15 slots long can transmit 15 SSCs.

The transmit order of the SSC depends on the primary scrambling code group number. As an example, in a 512 cell system, there are 64 groups. In each group, the patterns of the SSC and its cyclic shifts are different. As a result, there are 512 primary scrambling codes. Each cell of a 512 cell system is assigned a code such that no one code is used by more than one cell in a given reception area.

Therefore, cell search synchronization determines the primary scrambling code of a cell utilizing an initial cell search algorithm. Common initial cell searches implement three (3) major steps:

Step 1 algorithm: detect the PSC and determine a chip offset;

Step 2 algorithm: utilize the information given by the step 1 algorithm and detect the slot offset and code group number; and Step 3 algorithm: utilize the information provided by the step 2 algorithm and detect the primary scrambling code.

Unfortunately, each of the algorithms in each of the above steps has an inherent error associated with it. The error present in each of the steps is caused by the detection of noise by the WTRU associated with the received common downlink channel, which can result in a high number of false detections.

Because timing is unknown, the initial search must be carried out over the total time uncertainty of one frame. In the aforementioned examples, there are fifteen uplink and downlink timeslots during a frame. Since other WTRUs may be transmitting in the uplink timeslots, it is possible that a nearby WTRU transmission will have a higher detected energy than a distant cell. A low complexity method to reject this stronger, false detection and accept only valid PSC detections is required.

An additional problem with initial cell search algorithms is that they cannot handle a rejection by the upper layers of the wrong public land mobile network (PLMN). Since most algorithms detect the strongest cell in the common downlink channel, it is likely that each time the algorithm locates a cell, the same PLMN will be associated with the cell. This results in a deadlock and ultimately an indication to the WTRU that there is no service.

Accordingly, there exists a need for a system and method that reduces the number of false detections by the initial cell search algorithm and is able to overcome the deadlock associated with a rejection due to the wrong PLMN.

SUMMARY

The invention provides embodiments to facilitate cell search. In one embodiment, received samples are split into a plurality of sample sets for processing. Each of the sets is processed and an accumulated result is divided by an estimated noise value. In another embodiment, a code correlator correlates the received signal with a primary synchronization code and an auxiliary code correlator having a same length as the code correlator correlates the received signal with a code having a low cross correlation with the primary synchronization code. In another embodiment, a division of an accumulated result with a noise estimate is performed using indexes of the most significant bits.

BRIEF DESCRIPTION OF THE DRAWING(S)

DETAILED DESCRIPTION OF THE PREFERRED EMBODIMENT(S)

Figure 1:
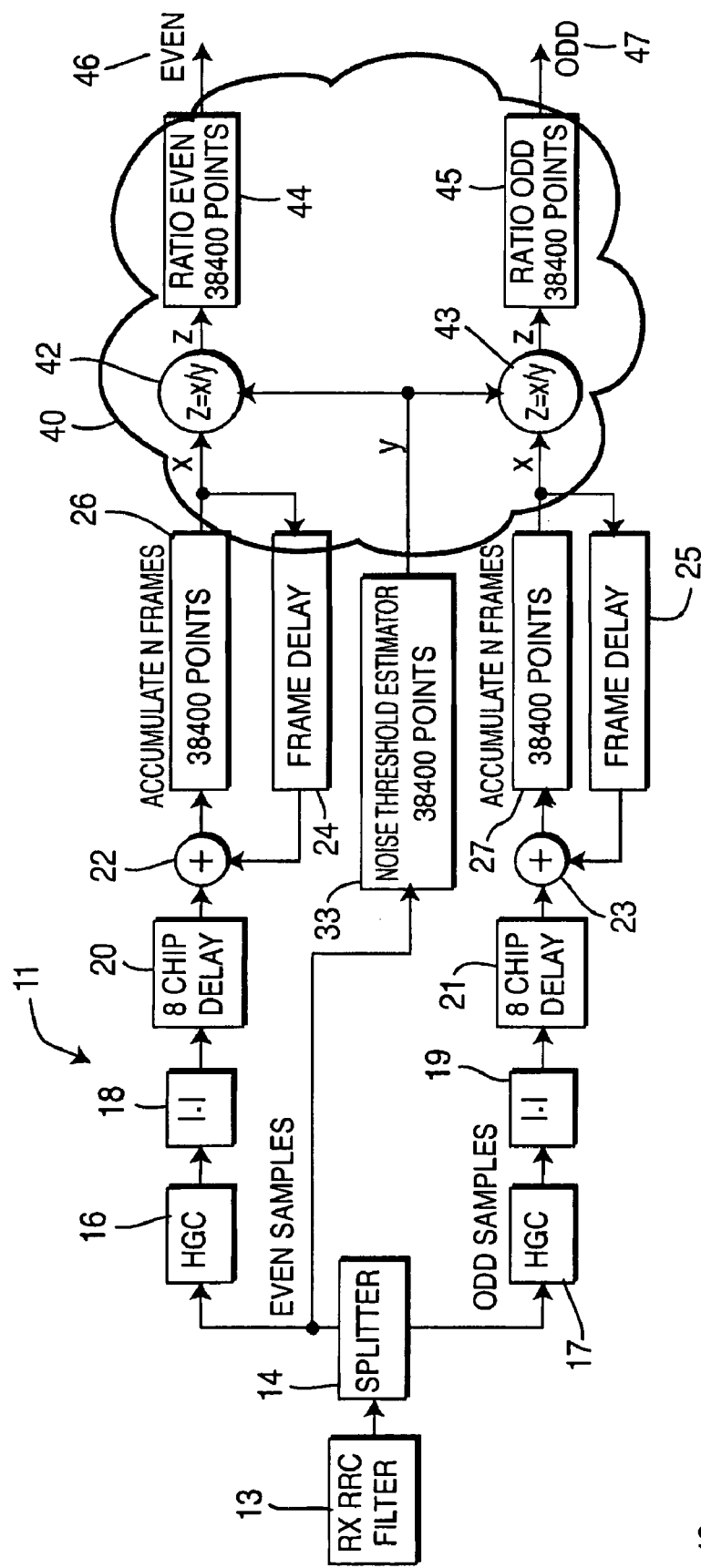
FIG. 1 is a block diagram illustrating the initial cell search system made in accordance with an exemplary embodiment of the present invention.

The present invention will be described with reference to the drawing figures wherein like numerals represent like elements throughout.

FIG. 1 is a block diagram of a primary synchronization code (PSC) module 11 for initial cell search embodying the principles of the present invention. The module 11 includes a receive Root Raised Cosine (RxRRC) filter 13, and a splitter 14 to separate samples into groups according to the over-sampling factor used. In this case with the over-sampling factor equal to two (2) samples are split into even and odd samples. Although if a higher sampling rate is used, the splitter may divide the samples into more than two sets, or in general N sets. Also shown are a pair of hierarchal Golay correlators (HGCs) 16, 17, a pair of absolute value modifiers (AVMs) 18, 19, chip delay circuits 20, 21, two adders 22, 23, two frame delay circuits 24, 25, two accumulator registers 26, 27, and a divider output stage 40. The divider output stage 40 includes two divider circuits 42, 43 and two registers 44, 45.

The RxRRC filter 13 samples the received communication signal and forwards the sampled signal to the splitter 14, which splits the filtered samples into even and odd samples, provided as separate signals. Thereafter even and odd samples are separately processed. The even and odd samples are respectively applied to the HGCs 16, 17, the AVMs 18, 19 and the chip delay circuits 20, 21, (which in the present example are shown as effecting 8-chip delays). The HGCs 16, 17 correlate the PSC of the input signal and respectively output the complex values of the even and odd samples of the input signal. The AVMs 18, 19 determine the magnitudes (i.e. absolute values) of the outputs from the HGCs 16, 17. In one example, the magnitude can be determined by following equation:

$$abs(x) \sim \max(|xreal|, |ximag|) + 0.5 * \min(|xreal|, |ximag|) \qquad \text{Equation (1)}$$

Equation (1) is only one example. However, other techniques which are detailed hereinafter may be utilized. The purpose of the determination is to reduce the magnitudes to an absolute value (x).

Once the approximated absolute values have been determined by the AVMs 18, 19, the chip delay circuits 20, 21 align the step responses of the HGCs 16, 17 and a noise threshold estimator 33, which receives the even samples from the splitter 14. Either odd or even samples could be used. More generally, with an over-sampling factor of N, any of the N sample streams could be used for such an input.

The outputs from the chip delay circuits 20, 21 are provided to the adders 22, 23, which receive delayed signals from frame delay circuits 24, 25 and sum corresponding chips of successive frames. The outputs from the adders 22, 23 are provided respectively to accumulator registers 26, 27, which provide outputs to the frame delay circuits 24, 25 as even and odd accumulator values. In addition, the noise threshold estimator 33 provides a noise threshold output that matches the size of the accumulator registers 26, 27.

The divider circuits 42, 43 of the divider output stage 40 receive the threshold value Y from the noise threshold circuit 33 and the outputs X of the accumulator registers 26, 27 and provide the results of the division operations Z=X/Y to registers 44, 45, respectively. The registers 44, 45 provide even and odd value outputs 46, 47. If the outputs X from the accumulator registers 26, 27 are less than the threshold value Y, then the respective outputs Z of the divider circuits 42, 43 is assumed to be zero, and a zero output value is provided to the registers 44, 45, otherwise division or other appropriate operation is performed.

Figure 2:
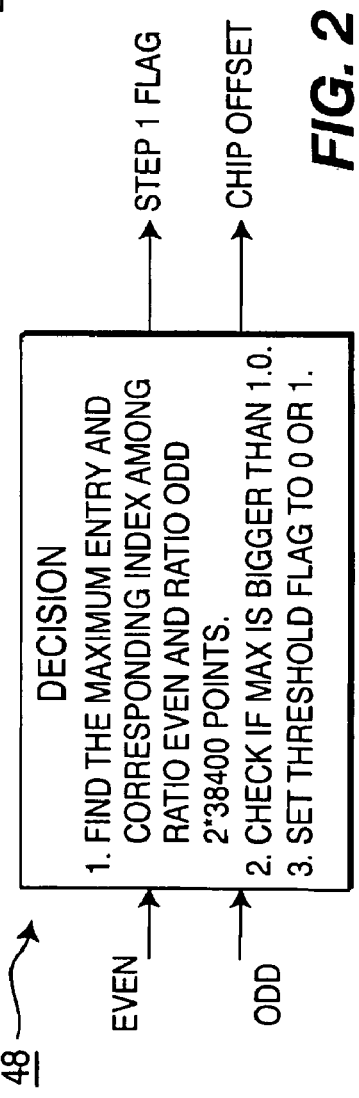
FIG. 2 is a diagram showing a decision module made in accordance with the present invention.

Referring to FIG. 2, a block diagram of a decision module 48 that operates on the even and odd value outputs 46, 47 of FIG. 1 is shown. The decision module 48 finds the maximum entry and corresponding index among even and odd value outputs 46, 47 points. In the exemplary embodiment, this is performed over 38,400 points for each of the even and odd value outputs 46, 47. A comparison is made to determine if the maximum entry is larger than one. If so, a threshold flag is set to one. If the maximum entry is smaller than one, the threshold flag is set to zero. The chip offset is derived from the index associated with the maximum entry.

Figure 3:
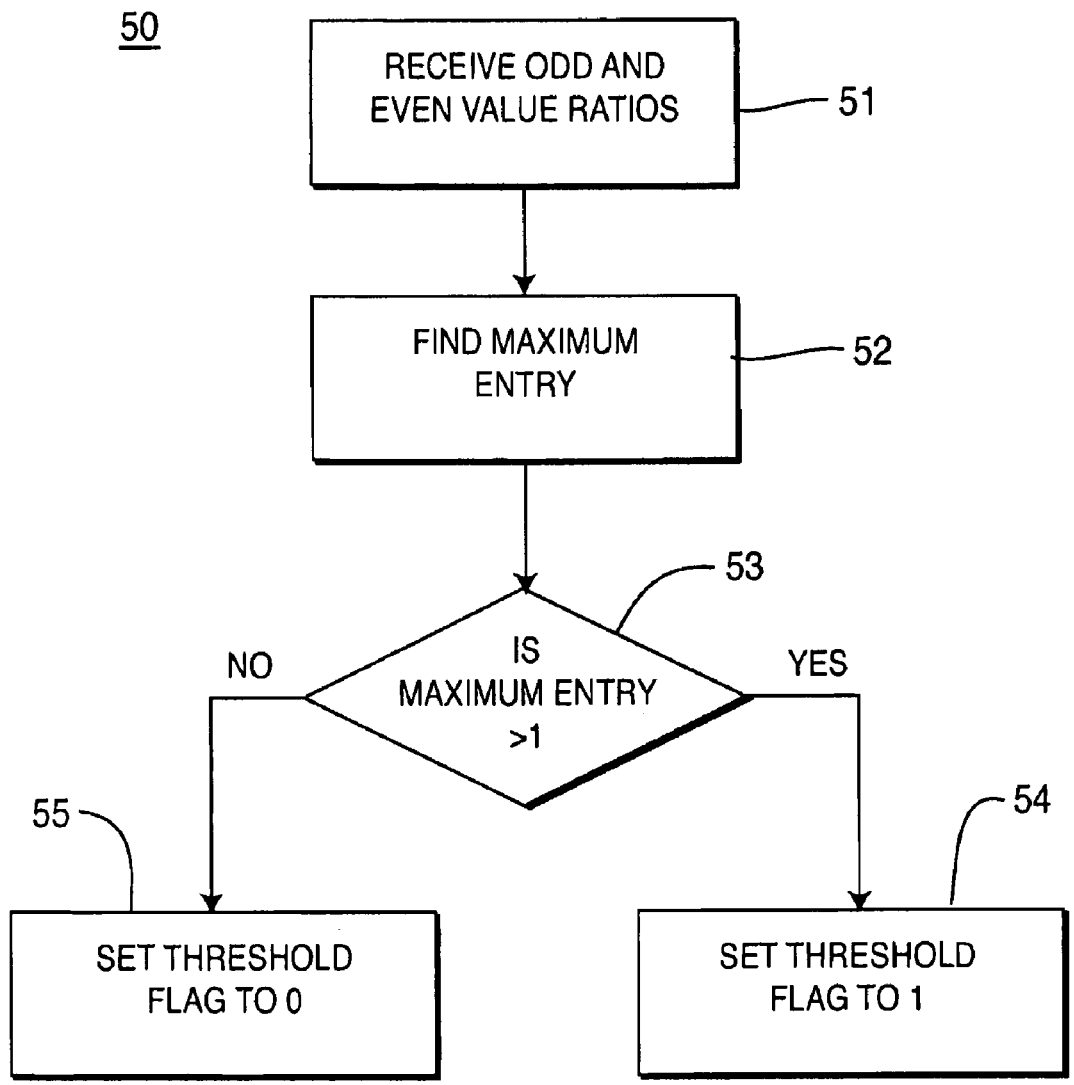
FIG. 3 is a flow diagram of the operation of the decision method of FIG. 2.

Referring to FIG. 3, a flow diagram of the process 50 implemented by the decision module 48 of FIG. 2 is shown. The process 50 is implemented in three steps. Even and odd value outputs 46, 47 are received (step 51) and a maximum entry and corresponding index among even and odd value outputs 46, 47 is determined (step 52). A determination is then made (step 53) if the maximum entry from step 52 exceeds 1. If so, the threshold flag is set to 1 (step 54); whereas if not, the threshold flag is set to 0 (step 55).

According to the present invention, a PSC processing algorithm is based on a division method (e.g., signal-to-noise ratio (SNR) estimate) and a new noise estimator. In general, an N-times oversampled detector processes N times the samples as the chip rate sampled detector. The noise estimation block outputs will only be used if qualified. In order to qualify the outputs, the signal power estimate must be greater than the noise power estimate scaled by some constant, (i.e., the noise threshold coefficient). Increasing or decreasing the noise threshold coefficient will vary the number of divisions required.

The division function performed by divider circuits 42, 43 can be simplified due to its low required dynamic range. The ratio A/B can be replaced by a monotonic function of the ratio $f(A/B)$, since only the maximum of the ratio must be found. There are several possible ways to exploit this. A first alternative method uses only shifts, adds, and a small lookup table (LUT) to implement such a function. A compare is also used to qualify the observation. It should be understood that this is only one preferred method. Other methods may be utilized.

Let A and B each be n-bit numbers. An approximation to $f(A/B)$ can be found by using $\log(x)$ as the monotone function. Also the calculation is only to be made when A is suitably larger than B. This is provided as a multi-step process:

Step 1) If A<kB, Stop (equivalent to clipping the low values; no need to perform the division because this observation has almost no chance of being the largest.)

Step 2a) Let a be the n-bit number taken from A starting at index I, the first non-zero entry in A starting at the MSB.

Step 2b) Let b be the n-bit number taken from B starting at index J, the first non-zero entry in B starting at the MSB.

Step 3) Use an n–1 bit LUT to find log(a) and log(b). Only n–1 bits are needed since the MSB bit is always '1'.

Step 4) The result is:

$$F(A, B) = \log(a) - \log(b) + I - J \approx \log\left(\frac{A}{B}\right) \qquad \text{Equation (2)}$$

Figure 4:
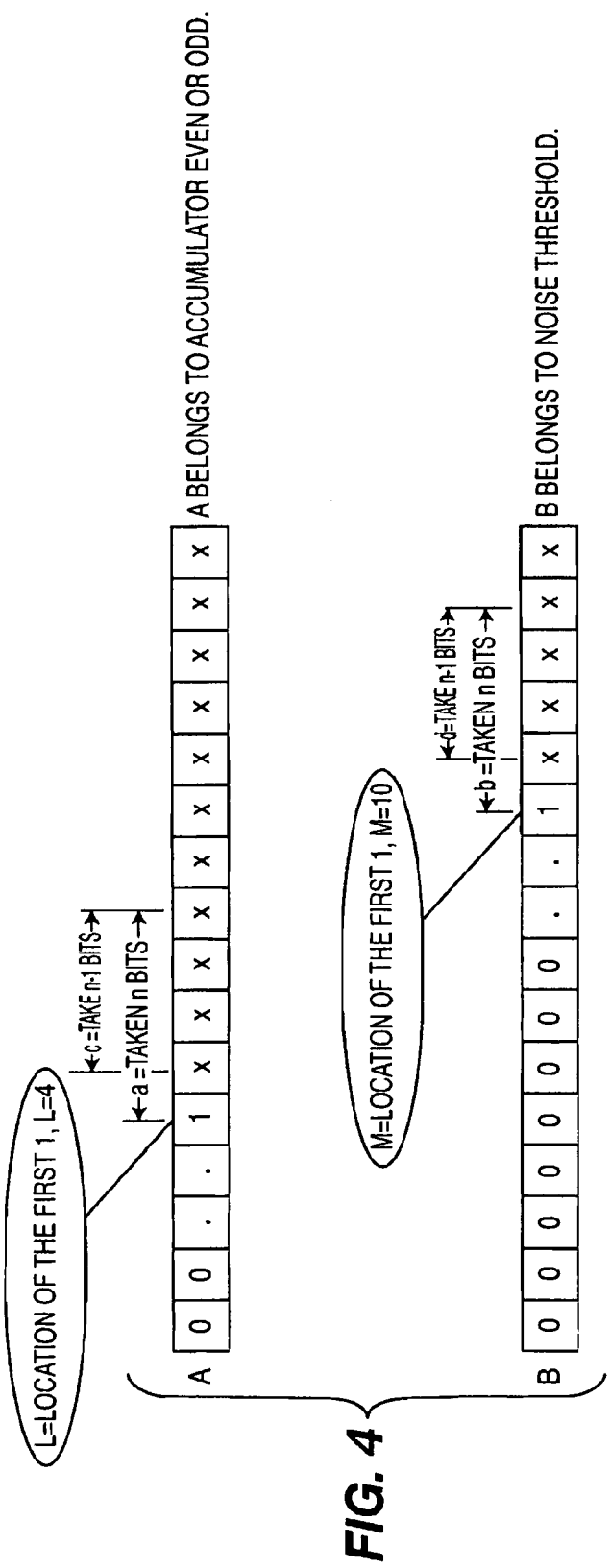
FIG. 4 is a block diagram of an example of efficient division in PSC processing algorithm of the present invention.
Figure 5:
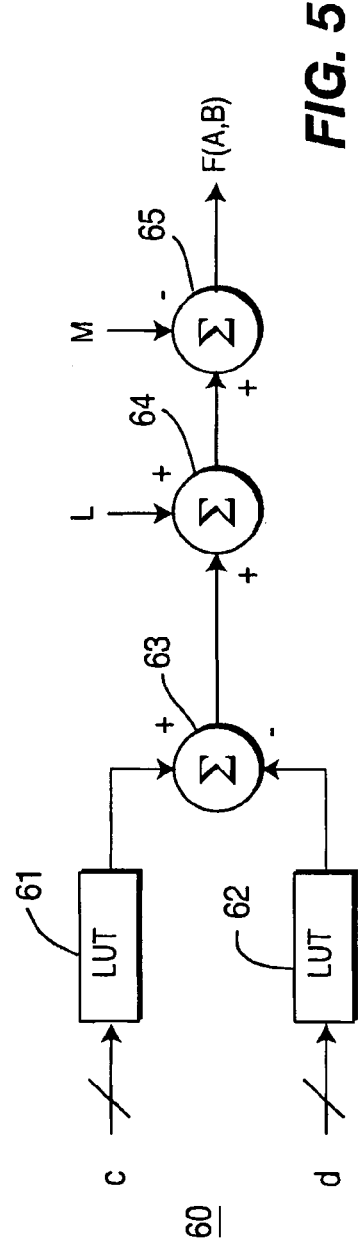
FIG. 5 is a block diagram of a circuit used to process the data depicted in FIG. 4.

One exemplary technique for implementing the inventive process is depicted in FIGS. 4 and 5. FIG. 4 shows two bit sequences in binary format A, B. The first bit sequence A corresponds to the output of one of the odd or even accumulators, (for example the even and odd value outputs 46, 47 in FIG. 1). The second bit sequence B corresponds to the noise threshold. The parameters c and d are then determined from A, and B as shown in the figure by taking n–1 bits. These parameters, c and d, are inputs to the circuit 60 of FIG. 5.

Referring to FIG. 5, the circuit 60 includes two lookup tables (LUTs) 61, 62, a first summing circuit 63, a second summing circuit 64 and a third summing circuit 65. The LUTs 61, 62 use c and d inputs and provide values in accordance with the following:

$$c = n-1 \text{ indicated LSB bits of } A \qquad \text{Equation (3)}$$

$$d = n-1 \text{ indicated LSB bits of } B \qquad \text{Equation (4)}$$

$$\text{LUT} = \log(x), x \in \{1,2,3, \ldots 2^{n-1}-1\} \qquad \text{Equation (5)}$$

The LUTs 61, 62 provide outputs which are summed in summing circuit 63. The output of the first summer 63 is provided to the second summer 64 which sums the value with a bit value corresponding to L, the location of the first 1 of bit sequence A, e.g., L=4. The output of the second summer 64 is provided to the third summer 65 which sums the value from the second summer 64 with a bit value corresponding to M, the location of the first 1 of the bit sequence B, e.g., M=10. This provides an output F(A,B), which can be used in place of A/B.

As shown in FIGS. 4 and 5, each division will require only two (2) shifts, two (2) LUT usages of the same LUT, and three (3) additions. In this way, the overall complexity compared to doing a full division on each point is dramatically reduced. The majority of observations will not lead to any divisions since the threshold will be set well above the mean value of the observations.

Because SNR estimates are made throughout the frame, both the HGCs 16, 17 and the noise threshold estimator 33 are subject to non-stationary noise, (e.g., the slot where the nearby WTRU is transmitting will be very noisy). Since SNR measurements are made throughout the frame, it is important that the HGCs 16, 17 and the noise threshold estimator 33 have a similar 'step response' to the changes in noise level. The method used is to correlate the signal with a code that has low correlation to the PSC and the secondary synchronization codes (SSC)s. This can also be implemented with a hierarchical Golay correlator referred to here as the auxiliary HGC. It is advantageous to include some additional filtering of the SNR estimate, e.g., a short FIR filter and the AHGC code should be shifted to compensate for the delay introduced by this filter. Since precise step response matching is impossible with the additional filter, the filter impulse response length should be kept short compared to the AHGC length. In this way, a low complexity, low variance noise estimate may be obtained with a similar step response to the HGC, thus providing good SNR estimates in the presence of non-stationary noise.

Figure 6:
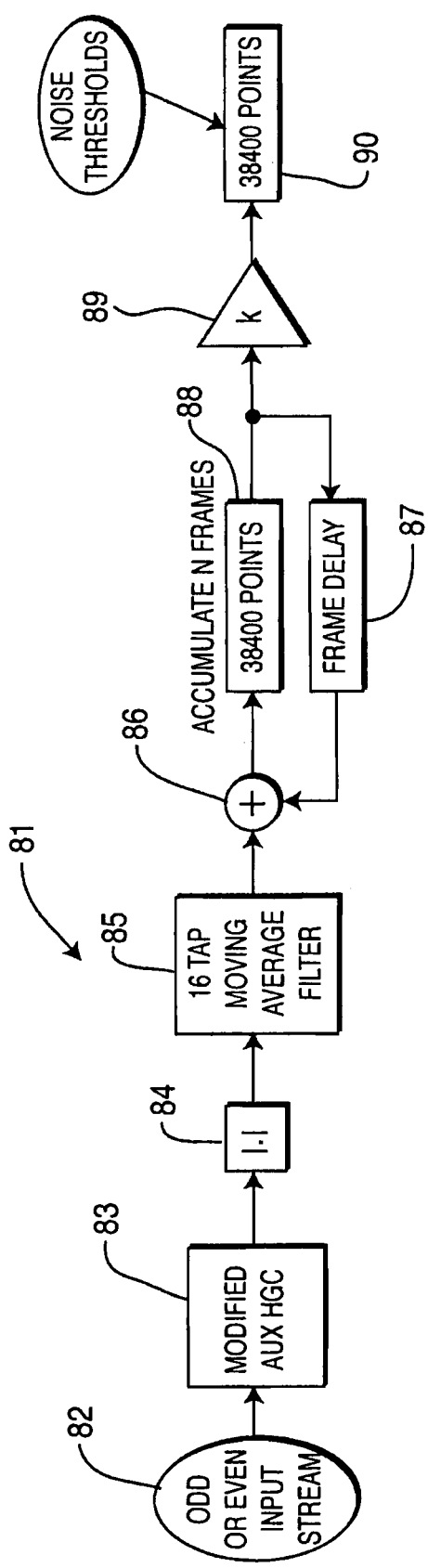
FIG. 6 is the noise threshold estimator.

FIG. 6 is a block diagram of the noise threshold estimator 33. The noise threshold estimator 33 is implemented with a 16-tap moving average (MA) filter. An even or odd input stream 82 is received and provided to a modified auxiliary HGC (AHGC) 83. An output from the AHGC 83 is provided to an AVM 84, which in turn provides its output to a 16 tap MA filter 85. The output of the MA filter 85 is provided to a summer 86 that receives a signal from a frame delay circuit 87, and provides a summed output to an accumulating register 88. The output from register 88 is provided to the frame delay circuit 87 and to an amplifier 89, which provides an output as a noise threshold at a register 90.

FIG. 6 is a block diagram of the noise threshold estimator 33. The noise threshold estimator 33 is implemented with a 16-tap moving average (MA) filter. An even or odd input stream 82 is received and provided to a modified auxiliary HGC 83. An output from the AHGC 83 is provided to AVM 84, which in turn provides its output to a 16 tap MA filter 85. The output of the MA filter 85 is provided to a summer 86 that receives a signal from a frame delay circuit 87, and provides a summed output to an accumulating register 88. The output from register 88 is provided to the frame delay circuit 87 and to an amplifier 89, which provides an output as a noise threshold at register 90.

Figure 7:
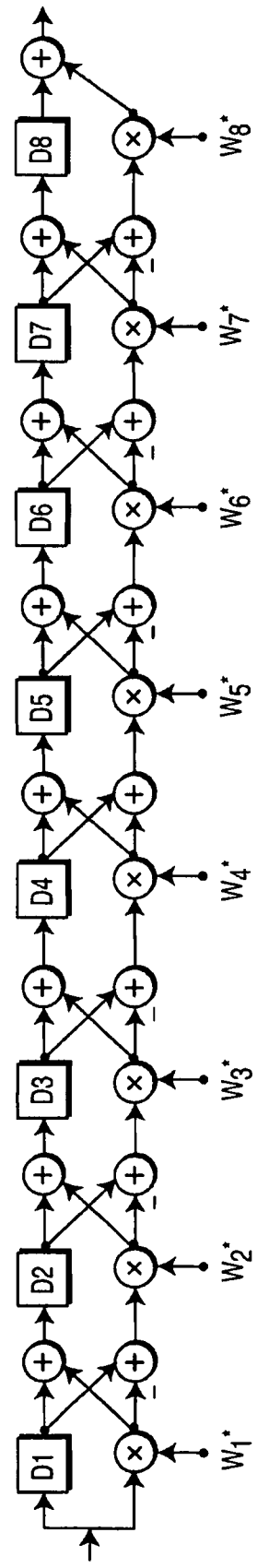
FIG. 7 is a diagram of an example of an AuxHGC internal structure for use in the noise estimation process in the noise threshold estimator.

FIG. 7 shows an example of a possible AuxHGC internal structure for use in the noise threshold estimator 33. The structure is an efficient Golay correlator selected to have low correlation to PSC and SSC codes. It should be noted that although specific values D and W are shown, many suitable parameters for D and W can be found.

The inventive use of an HGC for noise estimation, a qualification stage to reduce the number of samples to process, an SNR-based division method to generate statistics, and a simplified division process create a reliable and low complexity procedure for mitigating the problem of WTRU interference during cell search.

Although the preferred embodiments are described in conjunction with a third generation partnership program (3GPP) wideband code division multiple access (W-CDMA) system utilizing the time division duplex (TDD) mode, the embodiments are applicable to any hybrid code division multiple access (CDMA)/time division multiple access (TDMA) communication system. Additionally, some embodiments are applicable to CDMA systems, in general, using beam forming, such as the proposed frequency division duplex (FDD) mode of 3GPP W-CDMA.

What is claimed is:

1. A wireless transmit/receive unit (WTRU) comprising:
a splitter configured to receive samples and to output a plurality of N sample sets;
N circuits, each configured to receive a respective sample sets and to provide respective absolute value outputs corresponding to a primary synchronization code correlation to the sample set;
N circuits configured to provide respective accumulated values corresponding to the respective absolute value outputs; and
N circuits configured to divide the respective accumulated values with an estimated noise value to provide ratios for use in determining a chip offset of a received signal.

2. The WTRU of claim 1 wherein the splitter is configured to output two sample sets where a first set is of even samples and a second set is of odd samples.

3. A wireless transmit/receive unit (WTRU) comprising:
a code correlator configured to correlate a received signal with a primary synchronization code;
an auxiliary code correlator having a substantially similar length as the code correlator configured to correlate the received signal with a code having a low cross correlation with the primary synchronization code; and
a scaling circuit configured to scale an output of the code correlator by an output of the auxiliary code correlator.

4. The WTRU of claim 3 wherein the code correlator and the auxiliary code correlator are hierarchal Golay correlators.

5. A method for cell search in code division multiple access (CDMA) communications which utilize a primary synchronization code (PSC) transmitted at a predetermined chip rate, the method comprising:
sampling received wireless communication signals at a rate N times faster than the predetermined chip rate where N is a positive integer to produce samples;
splitting the samples into N streams of different samples such that for each successive set of N samples, an nth sample is assigned to a corresponding nth stream of samples for n equals 1 to N;
for each sample stream, generating correlation values by correlating with a PSC;
generating noise estimates with respect to one of the sample streams;
using respective correlation values and noise estimates to produce threshold comparison values with respect to each sample stream; and
detecting a chip offset based on the threshold comparison values.

6. The method of claim 5 wherein the generating noise estimates includes correlating with a code having low correlation with the PSC and a secondary synchronization code (SSC).

7. The method of claim 5 where N equals 2 wherein the splitting of samples is into streams of even samples and odd samples.

8. The method of claim 5 where the PSC is communicated in timeframes of a predefined timeframe format wherein the generating correlation values and the generating noise estimates are performed based on a selected accumulation of samples.

9. The method of claim 5 wherein the using respective correlation values and noise estimates to produce threshold comparison values includes:
    generating log values corresponding to the correlation values and the noise estimates, respectively, and
    subtracting the log values of the correlation values with the log values of the noise estimates.

10. The method of claim 9 wherein the log values are generated using a look-up table.

11. The method of claim 5 wherein the using respective correlation values and noise estimates to produce threshold comparison values is performed with a divider circuit.

12. The method of claim 5 wherein the generating correlation values by correlating with the PSC includes using a hierarchal Golay correlator.

13. The method of claim 5 wherein the generating noise estimates includes using a hierarchal Golay correlator.

14. The method of claim 5 wherein the detecting a chip offset based on the threshold comparison values includes determining maximum threshold comparison values with respect to selected sets of threshold comparison values for each stream of samples.

15. A wireless transmit receive unit (WTRU) configured for use in code division multiple access (CDMA) communications which utilize a primary synchronization code (PSC) transmitted at a predetermined chip rate, the WTRU comprising:
    a sampling component configured to sample received wireless communication signals at a rate N times faster than the predetermined chip rate where N is a positive integer to produce samples;
    a splitter configured to split the samples into N streams of different samples such that for each successive set of N samples, an nth sample is assigned to a corresponding nth stream of samples for n equals 1 to N;
    processing circuitry configured to generate correlation values for each sample stream by correlating with a PSC;
    the processing circuitry configured to generate noise estimates with respect to at least one of the sample streams;
    the processing circuitry configured to use respective correlation values and noise estimates to produce threshold comparison values with respect to each sample stream; and
    the processing circuitry configured to detect a chip offset based on the threshold comparison values.

16. The WTRU of claim 15 wherein the processing circuitry is configured to generate noise estimates by correlating samples streams with a code having low correlation with the PSC and a secondary synchronization code (SSC).

17. The WTRU of claim 15 wherein the splitter is configured to output two sample sets where a first set is of even samples and a second set is of odd samples.

18. The WTRU of claim 15 where the PSC is transmitted in timeframes of a predefined timeframe format wherein the processing circuitry is configured to generate the correlation values and to generate the noise estimates based on a selected accumulation of samples.

19. The WTRU of claim 15 wherein the processing circuitry is configured to use respective correlation values and noise estimates to produce threshold comparison values by:
    generating log values corresponding to the correlation values and the noise estimates, respectively, and
    subtracting the log values of the correlation values with the log values of the noise estimates.

20. The WTRU of claim 19 wherein the processing circuitry is configured to generate the log values using look-up tables.

21. The WTRU of claim 15 where the processing circuitry is configured with a divider circuit to produce threshold comparison values from the respective correlation values and noise estimates.

22. The WTRU of claim 15 wherein the processing circuitry is configured with a hierarchal Golay correlator to generate the correlation values and the noise estimates.

23. The WTRU of claim 15 wherein the processing circuitry is configured to detect the chip offset based on the threshold comparison values by determining maximum threshold comparison values with respect to selected sets of threshold comparison values for each stream of samples.

* * * * *